Figure 1:
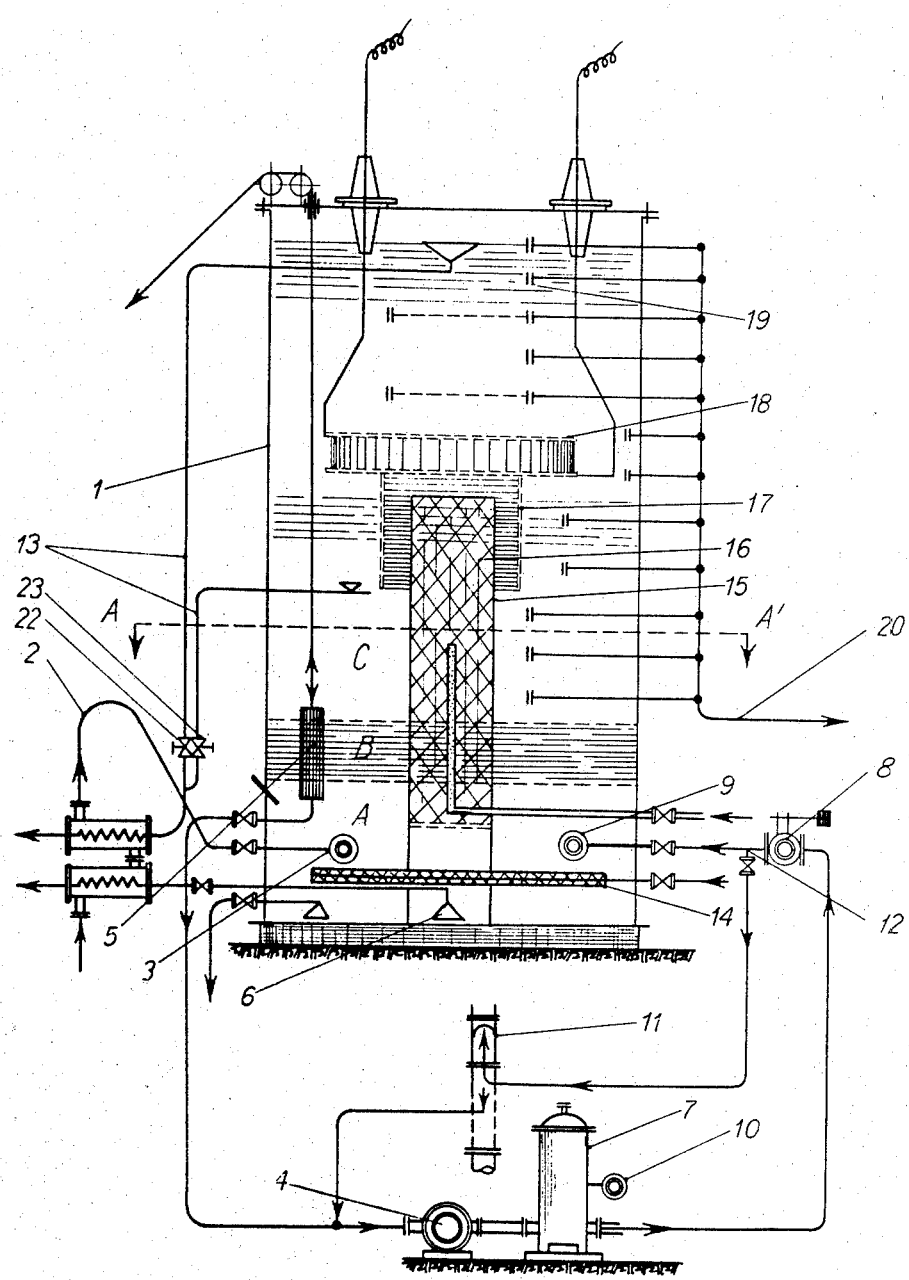
Figure 2:
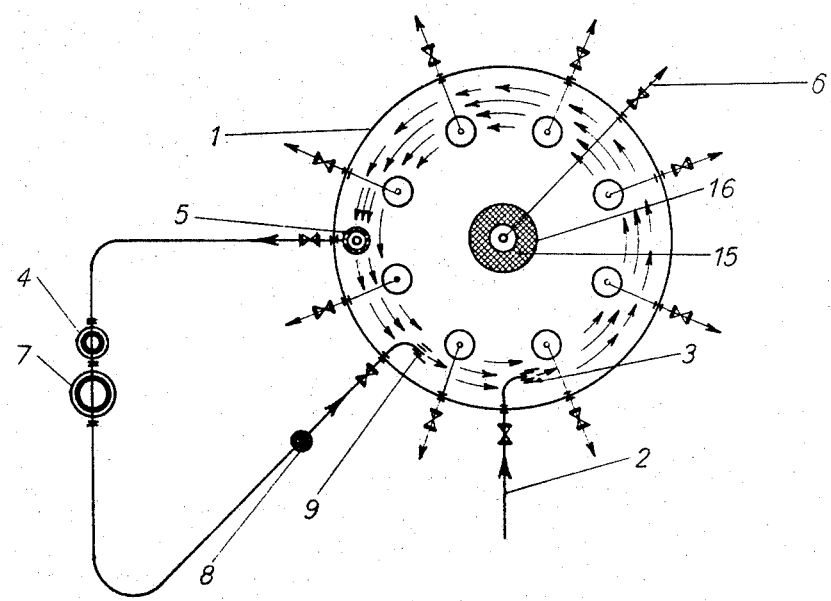
Figure 3:
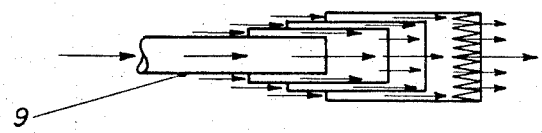

INVENTOR:
CORNELIU NICODIMESCU
BY *Arthur O. Klein*
his Attorney

Dec. 10, 1968     C. NICODIMESCU     3,415,738
METHOD FOR CRUDE OIL PURIFICATION
Filed July 29, 1964     2 Sheets-Sheet 2

INVENTOR:
CORNELIU NICODIMESCU
BY Arthur O. Klein
his Attorney

United States Patent Office
3,415,738
Patented Dec. 10, 1968

3,415,738
METHOD FOR CRUDE OIL PURIFICATION
Corneliu Nicodimescu, Bucharest, Rumania, assignor to Ministerul Petrolului, Bucharest, Rumania
Filed July 29, 1964, Ser. No. 385,867
Claims priority, application Rumania, Aug. 1, 1963, 46,731
6 Claims. (Cl. 208—187)

Crude oils as extracted from oil-wells are not pure but mixed with various liquid and solid matters such as: fine sand, clay, water with a content of dissolved salts, sodium and magnesium salts (in form of dispersed crystals in the oil mass) oxides, hydroxides, sulphides, iodides, dispersed or emulsified in the oil mass.

As such, these impurities are very difficult to separate by present-day methods, because they involve heavy oil losses and big processing expenses.

The separation of impurities is incomplete and in many cases even impossible because the applied methods are quite inefficient.

The methods so far employed as means for separating these contaminants are of thermal, chemical or electrical character.

(1) Thermal methods require cumbersome and expensive equipment; they lead to heavy losses and are inefficient.

(2) Chemical methods require a high consumption of chemical substances that are expensive, generally are unable to render the desired results, and sometimes lack the necessary efficiency.

The use of chemical substances for the separation of impurities leads to the inclusion of oils in waste water, which are thereafter drained to sewer lines and further in to rivers.

The utilized chemicals are in turn included in the oil mass, thus bringing corrosion to transport and processing equipment, due to their acid constituents.

(3) Electrical methods are not always effective and their efficiency is not satisfactory.

One of the known methods and installations which led to good results, and its use was consequently extended, is based on the principle of percolating electrical fields.

With the exception of the latter, all the thermal, chemical and electrical methods heretofore used, utilize the phenomonon of crude oil de-emulsification, so that the separations of impurities is carried out by natural settling in separate tanks.

The method according to the invention consists in injecting into the preheated mass of dirty crude oil emulsion (which generally comprises a plurality of zones) a small amount of this emulsion, previously mixed with water in 40%–60% proportion (the water used for the mixture can be separated from the bulk of dirty oil), then compressed at 5–10 kgf./sq. cm. pressure and, when brought by flash expansion to a state of instability, in which water and contaminants suddenly separate from crude oil, is injected into the mass of crude oil emulsion, to which the same state of instability is transmitted, thus acting as a de-emulsifying catalyst for the dirty mass of crude oil existing in the tank.

In starting the cleaning device or during normal performance, the entire dirty crude oil amount in the tank can be mixed with water, the mixture is then compressed at a pressure of 5–10 kgf./sq. cm., and is then subjected to flash expansion, thereby bringing the emulsion into a state of instability, which causes a sudden separation of water and foreign matters from the bulk of crude oil.

The pressure required for effectuating the flash expansion depends on the dirty oil-water ratio and on the temperature of the mixture. The definite values of the required pressure and temperature parameters for causing the phenomenon of spontaneous separation by means of flash expansion of the mixture is effectuated by means of a valve-nozzle.

This unstable state of sudden separation was termed by us "critical separation point" and its control can be achieved with the aid of a device forming part of this invention which is described below in detail.

In order to make the invention clearly understood, reference will be made to the accompanying drawings which are:

FIG. I is a schematic elevation of the crude oil cleaning plant;

FIG. II is a cross-sectional view along lines A–A' of FIG. I; and

FIG. III is a cross-sectional view of the mixture dispersion devices.

The crude oil containing salt water and solids dispersed in the oil mass, is fed to the lower part of tank 1, through pipe 2, provided with a dispersing device 3, located below the level of fluid mixture in the tank.

The crude oil, which contains impurities, rises to the separation zone B between the water zone A and the zone C of oil.

The processing of dirty crude oil proceeds as follows:

The mixture of dirty oil and water is compressed at a constant pressure, maintained by means of a pressure tank 7 and a valve-nozzle 8, in which the pressure is reduced. The expanded mixture is fed through a pipe, having its interior surface insulated, to the bulk of dirty crude oil which includes the aforementioned zones A, B and C in which it is perfectly dispersed with the aid of a disperser 9.

The critical mixture ratio and the critical pressure can be adjusted and the mixture is therefore checked through a glass globe looking-box 11.

A part of the mixture of dirty crude oil and water is drawn with pump 4 through a device 5 consisting of a vertical pipe with longitudinal draw-slots. The pump 4 can draw liquid via the device 5 simultaneously from water zone A and from emulsion zone B.

The water/dirty oil ratio is controlled by varying the level of the water which is drained through the funnel pipe 6 to sewerage; or by slidably moving the device 5 upwardly or downwardly.

The liquid mixture is drawn out of the tank 1 by means of the device 5 and is compressed by the pump 4, and then is fed via the pressure tank 7 to the valve-nozzle 8 where the expansion process takes place.

The mixture is immediately separated upon compression of the water-emulsion (dirty crude oil) mixture, followed by sudden expansion. The process of our invention also utilizes the phenomenon of electric loading.

Thus, after expansion, the mixture is dispersed into the crude oil mass at the bottom of tank 1 through the dispersing device 9.

The thus dispersed mixture induces also the separation of the impurities present in the medium, due to a large extent to the aforementioned electric charges.

The dispersing device 9 consists of a series of concentrically, arranged pipes which control the fluid flow. The jet of a mixture of dirty oil and water, at its highest impetus, reaches also its greatest separation effect due to expansion. The jet is guided by the dispersing device 9 in such a way as to affect the whole mass of the fluid in the tank, with which it is brought in the closest possible contact, at speeds comparable to the existing speed of the jet and under laminary flow conditions.

In the dispersing zone B, the liquid mixture delivered under pressure is separated and the now clean crude oil moves upwardly; meanwhile, water and impurities are collected in the bulk of liquid in zone A, from where they are discharged.

The delivery of liquid jets under pressure into the tank is preferably tangential so as to induce a rotary movement of the stored liquid mixture.

Due to this giratory movement, the foreign matters (the impurities) present in the dirty crude oil mass collect towards the center and there, come under the effect of electrical means in zone D. In the latter zone, electric neutralization and agglomeration takes place by means of metallic shavings or metallized wadding, which causes an acceleration of the separation and settling of impurities.

The D zone of electric neutralization and agglomeration is achieved by means of a metallic structure consisting of a cylindric frame surrounded by a wire net 15. The latter contains metallic shavings or metallized wadding 16, that induces a quicker separation of impurities by neutralization of the electric charges of the dispersed impurities.

The connecting pipe between the valve-nozzle 8 and the dispersing device 9 and the latter device itself are covered at their interior surfaces with a plastic material that has electrical insulating properties. The plastic material protects the expanded mixture of dirty crude oil and water against electrical neutralization until the mixture has reached the medium formed by the dirty oil.

The self-separating capacity and the de-emulsifying effect of the pressurized liquid mixture depend on the degree of expansion, i.e. on the compression/expansion ratio, which is also directly related to the developed electric charges.

The degree of crude oil expansion and compression before and after the valve-nozzle 8 is checked with gauge 10. The degree of instability of the dirty crude oil and water mixture can be observed through the dispersing device equipped with a glass globe 11, which is fed by means of the valve intake 12.

The valve-nozzle 8 serves to maintain at a constant value the compression pressure and also serves to achieve mixture expansion.

The apparatus according to the invention can utilize chemical additives for the treatment of dirty crude oil with a view of reducing the necessary time for separation of the impurities from the treated dirty material.

In order to accelerate the separation and agglomeration of traces of solid matters and chemicals, it is possible, in special cases, to add also the action of an electric field. The latter is produced by the upright and level electrodes 17 and 18, which are charged with a high electric voltage from an outside electrical power source.

As a means of accelerating the separation by expansion, a small amount of a de-emulsifier agent or of residues obtained in a station for chemical de-emulsification or also acid residues from refining processes may be eventually added to the liquid mixture.

The de-emulsifying agent or the residues added are acting as catalysts and, as such, a small amount of the agents can be recycled, hence many times re-used.

The separating effect of the agent added regenerates itself continuously as a result of the successive compression and expansion steps to which it is subjected before being delivered, under pressure, into the bulk of dirty oil.

The additive consumption is consequently quite small. Additives can therefore be used economically as catalysts under continuous regeneration.

In order to improve the coagulating and agglomerating action exerted on the solid impurities dispersed in the bulk of crude oil, lime water can be added to the water in the case of dirty oils containing grey or red clays in a colloidal state, iodides or sulphides.

Crude oil warming is achieved indirectly, by mixing the crude oil with water heated to the necessary temperature, in a manner which avoids the formation of gases during warming.

Water is heated with the aid of exhaust or live steam circulating through the heating coils 14 provided on the bottom, inside the water zone A, constant temperature is thus maintained. Exhaust steam is employed because the utilization of live steam would not be economical.

The progress of the process of this invention is controlled by means of a working diagram.

The control is achieved by checking the impurities content of the crude oil.

A series of condenser-transducers 19 are mounted at various levels inside the processing tank.

Each condenser-transducer is connected outside the apparatus to an electronic circuit. Impurities content variations in the crude oil situated between the condenser plates inside the tank 1 are transmitted outside the apparatus to an indicating instrument. The fluctuations of the transmitted electric current, correspond to the respective variations of the percent impurities content in the crude oil.

Transmission is achieved through a wire channel 20 to a controlling device 21, where all the indicating instruments are arranged one above the other in accordance with the respective locations of their condensers in the tank 1, so that a curve is built up by the totality of the simultaneously indicated points.

This curve is a measure of the degree of efficiency of the prevailing process; i.e. compression pressure, mixture temperature quality of the added water, efficiency of additives, therefore the overall efficiency of the progressing process.

Dirty crude oil purification can be carried out in two different ways, either continuously or intermittently, depending on the local conditions and requirements.

In continuous operation, processing takes place with valve 22 in open position and draining of clean crude oil is continuous, according to the indications of the curve showing the impurities content.

This method, and the apparatus as well, can be utilized in conjunction with equipments for electrical treatment, comprising pressurized, spherical or also upright cylindrical zeppelin-shaped tanks which are frequently used in refineries.

In applying my method, this equipment can be brought to the desired efficiency, which is nowadays impossible to achieve with such installations, because with the known processes they operate at low efficiencies and high cost prices.

The new plant for the purification of crude oil according to the invention renders the following advantages and savings:

(1) The proposed plant ensures the separation of all liquid impurities and dissolved salts and the agglomeration of all solid impurities in colloidal form, dispersed in the bulk of crude oil, e.g., salt water, salt particles, red and grey clays, oxides, sulphides, iodides, sulphur, iodine, etc. owing to the fact that said method and plant are far more efficient than those utilized nowadays and impurities separation is complete.

(2) By means of the method of my invention and the corresponding plant for cleaning dirty crude oils, all sorts of oils with any content of impurities can be treated.

The method is just as efficient and economic in treating the type crude oil which have a high percent of liquid impurities, and a great amount of solid impurities, in the form of an emulsion in the crude oil mass and in a colloidal state.

(3) The equipment is explosion-proof due to its basic operating principle and to its structure, and due to the fact that the whole plant is absolutely tight.

(4) The crude oil purification according to my new method, does not employ chemicals as the principal aid for de-emulsification so that into the bulk of purified crude oil no acids resulting from de-emulsifying agents are introduced, avoiding thereby corrosion of the processing equipment in the refineries.

At the same time, by eliminating the use of chemical de-emulsifying agents, the losses of a crude oil and water mixture to sewerage are also eliminated; these losses represent a high percentage in the known processes, rising up to 4%, and were due to the noneconomical use of the chemical de-emulsifying agents.

The fact that in the new method small amounts of de-emulsifying agents or of residues are added, is devoid of any adverse influence, because these additives are immediately neutralized, and further on act as catalysts and not as acids.

(5) In the crude oil purification by the new method, crude oil heating is effected indirectly by mixing the mixture with water previously warmed to the necessary temperature.

The water is heated with the aid of exhaust or live steam which is conducted through coils 14 immersed in the water zone A.

Crude oil heating is homogenous, through direct contact with water but not with the steam pipes.

Thus, crude oil gasification, salt crystals formation and increased stability of the emulsion are avoided.

(6) Due to the simplicity of the plant and of the operational method and control of the process it is possible to mount the apparatus of this invention in the oilfield adjacent to the separating tanks, thus avoiding the utilization of separate storage and settling tanks.

(7) The proposed method and technology may be also utilized in other types of processes for the purification of dirty crude oils, such as mechanical, thermal, chemical or electrical treatments, or processes employing the steps of neutralization, washing or pressurizing.

In the same plant, be it new or already installed, with normal spherical tanks or of the zeppelin-shaped type tank under pressure, a complex simultaneous or successive treatment can be achieved with the apparatus and method of my invention with a view of obtaining optimum economical results.

Although the process and apparatus of the present invention has been described in connection with preferred embodiments, it is to be understood that modifications and variations may be resorted to without departing from the spirit and scope of this invention, as those skilled in the art will readily understand. Such modifications and variations are considered to be within the purview and scope of the invention and appended claims.

What I claim is:

1. A method of purifying dirty emulsified crude oil, containing salt water and solid impurities, under atmospheric pressure conditions, in a vertical cylindrical space, in which there are present from the bottom to the top thereof: a zone A essentially consisting of salt water which contains solid impurities, a zone B essentially consisting of heated dirty crude oil, a zone C essentially consisting of de-emulsified crude oil; said method comprising the steps of simultaneously taking from said zones B and A a predetermined amount of said crude oil and water preheated to a temperature as high as 100° C., and containing about 40 to 60% water, compressing said mixture at about 5 to 10 kg. per cm.$^2$, and injecting said mixture into zone A, whereby a sudden release of pressure occurs, which results in a substantial separation of the oil from the water and said solid impurities, and evacuating said purified crude oil from zone C, the water with said solid impurities being evacuated from zone A.

2. The method as set forth in claim 1, wherein the cylindrical working space contains in the area of its axis, a cylindrical narrow agglomeration zone D, filled with steel splinter or metallized wadding, in which zone fine solid impurities resulting from de-emulsification collect and agglomerate, said solid impurities being thereby taken downwards faster into the water zone A.

3. The method as set forth in claim 1, wherein said dirty and heated crude oil is injected tangentially into said cylindrical space within the confines of zone A, so as to give rise to circular flow therein, said flow slightly ascending and being laminar in character, whereby said water of zone A is washed and out of which said crude oil rises, thereby blending with the dirty crude oil of zone B.

4. The method as set forth in claim 1, including the step of adding a relatively small amount of lime water to the mass of dirty crude oil, said added lime water acting as a de-emulsifying agent.

5. The method as set forth in claim 1, including the step of adding a relatively small amount of acid, obtained as a residue from a crude oil refining process, said acid acting as a de-emulsifying agent.

6. The method as set forth in claim 1, including the step of placing said mass of dirty crude oil under the influence of an electric field thereby accelerating the separation and agglomeration of impurities located therein.

References Cited

UNITED STATES PATENTS

| 2,478,934 | 8/1949 | Morse | 210—243 |
| 2,534,907 | 12/1950 | Ham et al. | 210—243 |
| 2,730,240 | 1/1956 | Johnson | 208—188 |
| 2,793,751 | 5/1957 | Broidrick | 208—188 |

OTHER REFERENCES

Uren—"Petroleum Production Engineering"—3rd Ed., 1953, McGraw-Hill, New York, pp. 571, 573, 575–76, 582–83, 594–99.

DELBERT E. GANTZ, Primary Examiner.

R. H. SHUBERT, Assistant Examiner.

U.S. Cl. X.R.

208—188; 210—243